US011353256B2

(12) United States Patent
Dherde et al.

(10) Patent No.: US 11,353,256 B2
(45) Date of Patent: *Jun. 7, 2022

(54) HINGE SUPPORT ASSEMBLY

(71) Applicant: WHIRLPOOL CORPORATION, Benton Harbor, MI (US)

(72) Inventors: Eric J. Dherde, St. Joseph, MI (US); Michael A. Fiori, Stevensville, MI (US); Lynne F. Hunter, Dorr, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/139,126

(22) Filed: Dec. 31, 2020

(65) Prior Publication Data

US 2021/0123659 A1  Apr. 29, 2021

Related U.S. Application Data

(63) Continuation of application No. 16/309,998, filed as application No. PCT/US2016/064605 on Dec. 2, 2016, now Pat. No. 10,907,883.

(51) Int. Cl.
*F25D 23/02* (2006.01)
*E05D 7/081* (2006.01)
*F25D 23/06* (2006.01)
*E05D 5/04* (2006.01)
(Continued)

(52) U.S. Cl.
CPC .......... *F25D 23/028* (2013.01); *E05D 5/046* (2013.01); *E05D 7/081* (2013.01); *F25D 23/062* (2013.01); *F25D 23/066* (2013.01); *E05D 2005/0292* (2013.01); *E05Y 2900/31* (2013.01); *F24C 15/023* (2013.01); *F25D 2201/14* (2013.01); *F25D 2323/021* (2013.01); *F25D 2323/024* (2013.01)

(58) Field of Classification Search
CPC ............ F25D 23/028; F25D 2323/024; F25D 23/066; E05D 5/046; E05D 2005/0292; E05Y 2900/31
See application file for complete search history.

(56) References Cited

U.S. PATENT DOCUMENTS

| | | | |
|---|---|---|---|
| 2,884,099 A | | 4/1959 | Nenzell |
| 4,632,470 A | * | 12/1986 | Jenkins ................. F25D 23/062 29/525.12 |
| 5,064,255 A | * | 11/1991 | Inui ......................... F25D 23/02 312/405 |
| 4,903,858 A | | 2/1990 | Clark et al. |

(Continued)

FOREIGN PATENT DOCUMENTS

| | | |
|---|---|---|
| DE | 29504901 U1 | 5/1995 |
| DE | 20212002 U1 | 9/2002 |

(Continued)

*Primary Examiner* — Daniel J Rohrhoff
(74) *Attorney, Agent, or Firm* — Price Heneveld LLP

(57) ABSTRACT

An appliance is provided herein. The appliance includes a cabinet having a wrapper, a liner, and a trim breaker. The wrapper, the liner, and the trim breaker define an insulating cavity therebetween. An insulating material is disposed within the insulating cavity. A frame includes an upper frame portion, a vertical frame portion, and a lower frame portion. The lower portion includes a top section, a bottom section, an inner section, and a front section. A door is rotationally mounted to the cabinet via an upper hinge and a lower hinge mounted to the frame.

20 Claims, 9 Drawing Sheets

(51) Int. Cl.
*F24C 15/02* (2006.01)
*E05D 5/02* (2006.01)

(56) References Cited

U.S. PATENT DOCUMENTS

| | | |
|---|---|---|
| 5,666,764 A | 9/1997 | Beatty et al. |
| 5,687,509 A | 11/1997 | Barroero et al. |
| 6,036,293 A | 3/2000 | Anell et al. |
| 6,997,530 B2 | 2/2006 | Avendano et al. |
| 7,014,283 B2 | 3/2006 | Grace et al. |
| 8,752,921 B2 | 6/2014 | Gorz et al. |
| 8,944,541 B2 | 2/2015 | Allard et al. |
| 10,598,424 B2 | 3/2020 | Dherde et al. |
| 10,753,669 B2 | 8/2020 | Dherde et al. |
| 10,907,883 B2 * | 2/2021 | Dherde ................ F25D 23/028 |
| 2004/0012315 A1 * | 1/2004 | Grace ................... F25D 23/062 312/406 |
| 2009/0025178 A1 * | 1/2009 | Tamayama ............. E05D 5/065 16/221 |
| 2009/0284116 A1 * | 11/2009 | Gorz .................... F25D 23/062 312/405 |
| 2011/0140585 A1 * | 6/2011 | Lee ...................... E05D 7/0027 312/405 |
| 2012/0037642 A1 | 2/2012 | Sun et al. |
| 2017/0184341 A1 * | 6/2017 | Grimm ................. F25D 21/04 |
| 2019/0212051 A1 | 7/2019 | Mayer et al. |

FOREIGN PATENT DOCUMENTS

| | | |
|---|---|---|
| DE | 102005057150 A1 | 6/2007 |
| DE | 202008005332 U1 | 9/2008 |
| DE | 102016203052 A1 | 8/2017 |
| JP | H04222378 A | 8/1992 |
| WO | 2015019833 A1 | 2/2015 |
| WO | 2015194203 A1 | 12/2015 |

* cited by examiner

HINGE SUPPORT ASSEMBLY

CROSS-REFERENCE TO RELATED APPLICATION

This application is a continuation of U.S. application Ser. No. 16/309,998, filed on Dec. 14, 2018, now U.S. Pat. No. 10,907,883 entitled "HINGE SUPPORT ASSEMBLY," which is a National Stage Application under 35 U.S.C. § 371 of International Application No. PCT/US2016/064605, filed on Dec. 2, 2016, entitled "HINGE SUPPORT ASSEMBLY," the disclosures of which are hereby incorporated herein by reference in their entirety.

FIELD OF THE DEVICE

The present disclosure generally relates to support structures for appliances, and more specifically, to a frame incorporated as part of the appliance for supporting hinges that are coupled to the appliance and a door.

BACKGROUND

Refrigerated appliances commonly define one or more compartments therein that are accessible through a door. The door is coupled to the appliance through a hinge. It is desired to maximize support for the hinge.

SUMMARY

According to one aspect of the present disclosure, an appliance is disclosed. The appliance includes a cabinet having a wrapper, a liner, and a trim breaker. The wrapper, the liner, and the trim breaker define an insulating cavity therebetween. An insulating material is disposed within the insulating cavity. A frame includes an upper frame portion, a vertical frame portion, and a lower frame portion. The lower portion includes a top section, a bottom section, an inner section, and a front section. A door is rotationally mounted to the cabinet via an upper hinge and a lower hinge mounted to the frame.

According to another aspect of the present disclosure, an appliance is disclosed. The appliance includes a cabinet defining an insulating cavity. A frame includes an upper frame portion, a vertical frame portion, and a lower frame portion. First and second attachment receptacles are disposed on an upper hinge mount and a lower hinge mount, respectively. A coupling receptacle is disposed on the lower frame portion. A door is rotationally mounted to the cabinet via an upper hinge mounted to the upper hinge mount and a lower hinge mounted to the lower hinge mount.

According to yet another aspect of the present disclosure, an appliance is disclosed. The appliance includes a cabinet defining an insulating cavity. A frame is disposed within the insulating cavity and including a lower frame portion. One or more hermetically sealed attachment receptacles are disposed on the lower frame portion. One or more coupling receptacles join the lower frame portion to a vertical frame portion. A door is rotationally mounted to the cabinet via the frame via a hinge. The hinge is disposed on an opposing side of the cabinet from the frame.

These and other features, advantages, and objects of the present device will be further understood and appreciated by those skilled in the art upon studying the following specification, claims, and appended drawings.

DETAILED DESCRIPTION OF EMBODIMENTS

Figure 1:
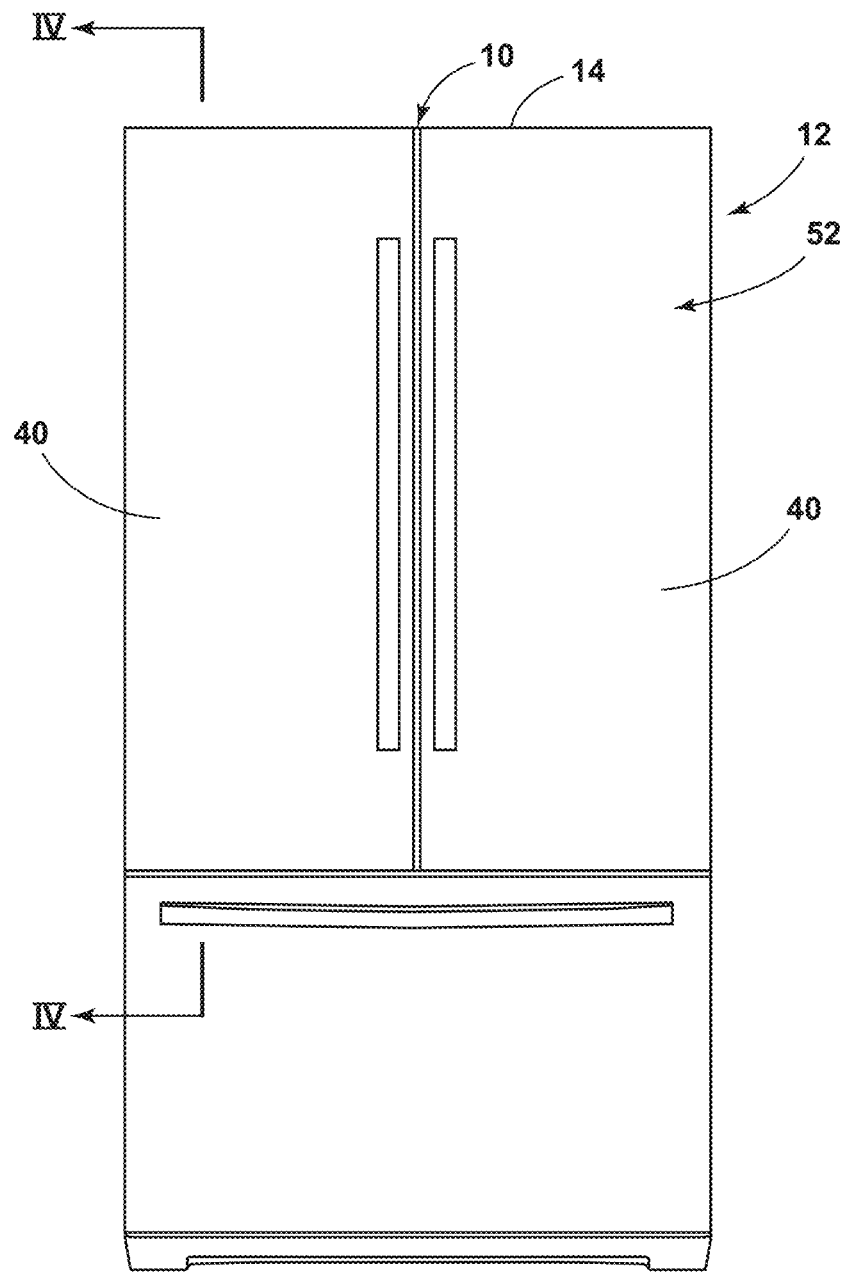
FIG. 1 is a front elevational view of an appliance incorporating a hinge support frame with a pair of doors in a closed position, according to various embodiments.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As illustrated in FIGS. 1-14, a cabinet 10 for an appliance 12 may include a wrapper 14, a liner 16, and a trim breaker 18 that defines a joint extending between portions of the wrapper 14 and the liner 16. The wrapper 14, the liner 16, and the trim breaker 18 define an insulating cavity 20 within the cabinet 10. A vacuum insulated structure 22 can be disposed within the insulating cavity 20. It is contemplated that the vacuum insulated structure 22 can be a vacuum insulated panel disposed within the insulating cavity 20. The vacuum insulated structure 22 can also be defined by an insulating material 24 disposed within the insulating cavity 20, where gas is expressed from the insulating cavity 20 to define an at least partial vacuum of the vacuum insulated structure 22.

Referring again to FIGS. 1-14, a hinge support frame 26 includes an upper frame portion 28, a vertical frame portion 30, and a lower frame portion 32. The frame may be at least partially disposed within the insulating cavity 20. An upper hinge mount 34 is disposed on the upper frame portion 28. A lower hinge mount 36 is disposed on the lower frame portion 32. According to various embodiments, the lower frame portion 32 has a closed outer periphery 88. A door 40 is rotationally mounted to the cabinet 10 via an upper hinge 42 mounted to the upper hinge mount 34 and a lower hinge mounted to the lower hinge mount 36. The upper and lower hinge mounts 34, 36 receive downward forces 46, rotational forces 48, torsion 50, shear stresses, etc. exerted by the door 40 onto the cabinet 10. The upper and lower hinge mounts 34, 36 may transfer these downward forces 46, rotational forces 48, and/or torsion 50 to the vertical frame portion 30.

Figure 2:
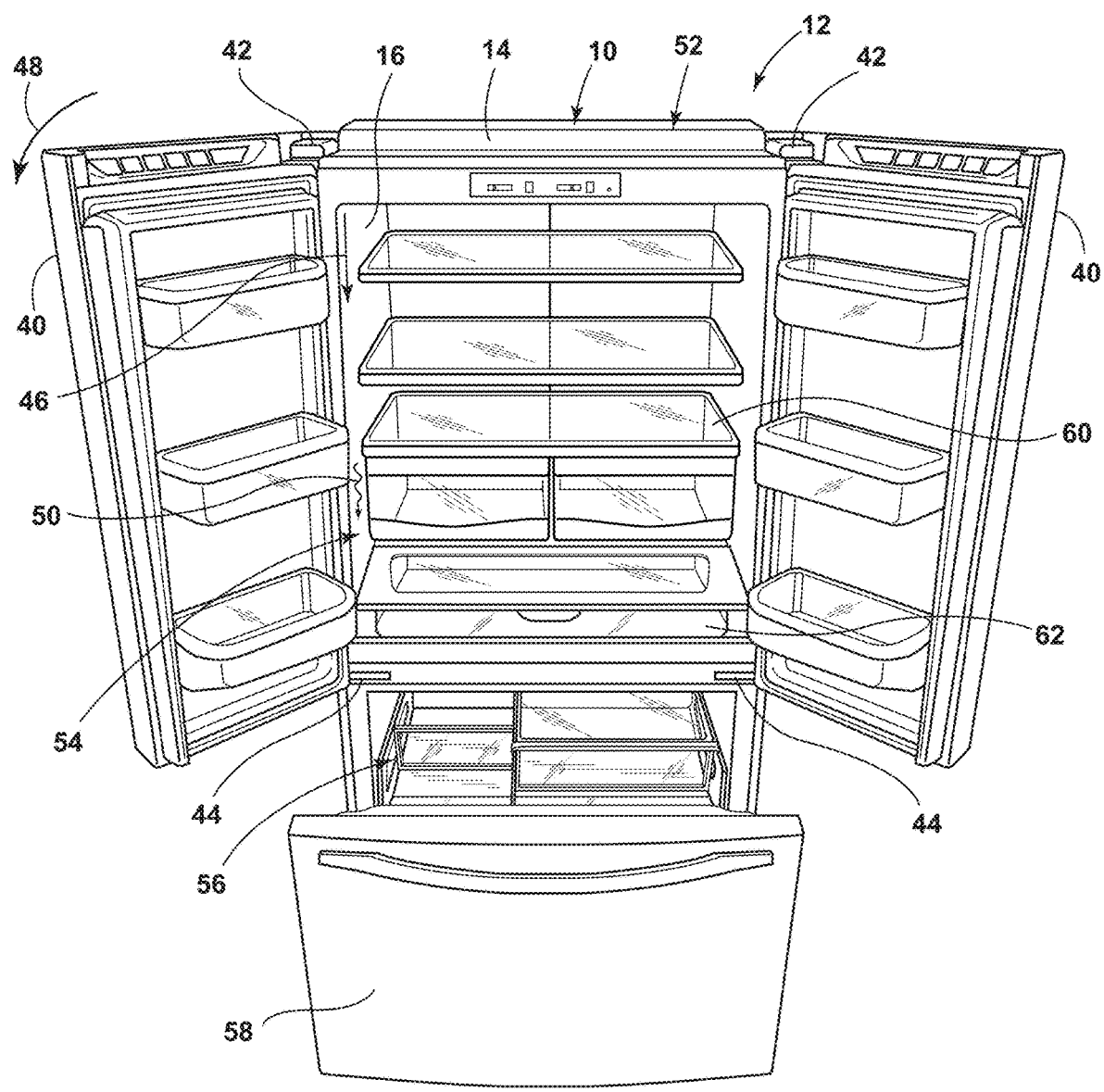
FIG. 2 is a front perspective view of the appliance of FIG. 1 with the pair of doors in an open position.

Referring to FIGS. 1 and 2, the appliance 12 is configured as a refrigerator 52 that includes a refrigerator compartment 54 and a freezer compartment 56. The cabinet 10 of the appliance 12 can include an interior mullion 64 that defines the plurality of interior compartments 54, 56. A pair of doors 40 is operable between a closed position (FIG. 1) and an open position (FIG. 2) to selectively provide access to the refrigerator compartment 54, while a drawer 58 may be used to selectively provide access to the freezer compartment 56. The configuration of the refrigerator 52 of FIGS. 1 and 2 is exemplary only and the present concept is contemplated for use in all refrigerator styles including, but not limited to, side-by-side refrigerators, whole refrigerator and freezers, and refrigerators with upper freezer compartments.

Referring now to FIG. 2, the pair of doors 40 is shown in an open position to reveal an interior of the refrigerator compartment 54. It is contemplated that the refrigerator compartment 54 may include any number of shelves 60 or drawers 62 disposed therein for storing various food items within the refrigerator compartment 54. The freezer compartment 56 may also include any number of shelves 60 and/or drawers 62. Cooling components are operably coupled with the refrigerator compartment 54 and/or the freezer compartment 56 and may include a compressor, a condenser, an expansion valve, an evaporator, a plurality of conduits, and other related components used for cooling the refrigerator and freezer compartments 54, 56.

Figure 3:
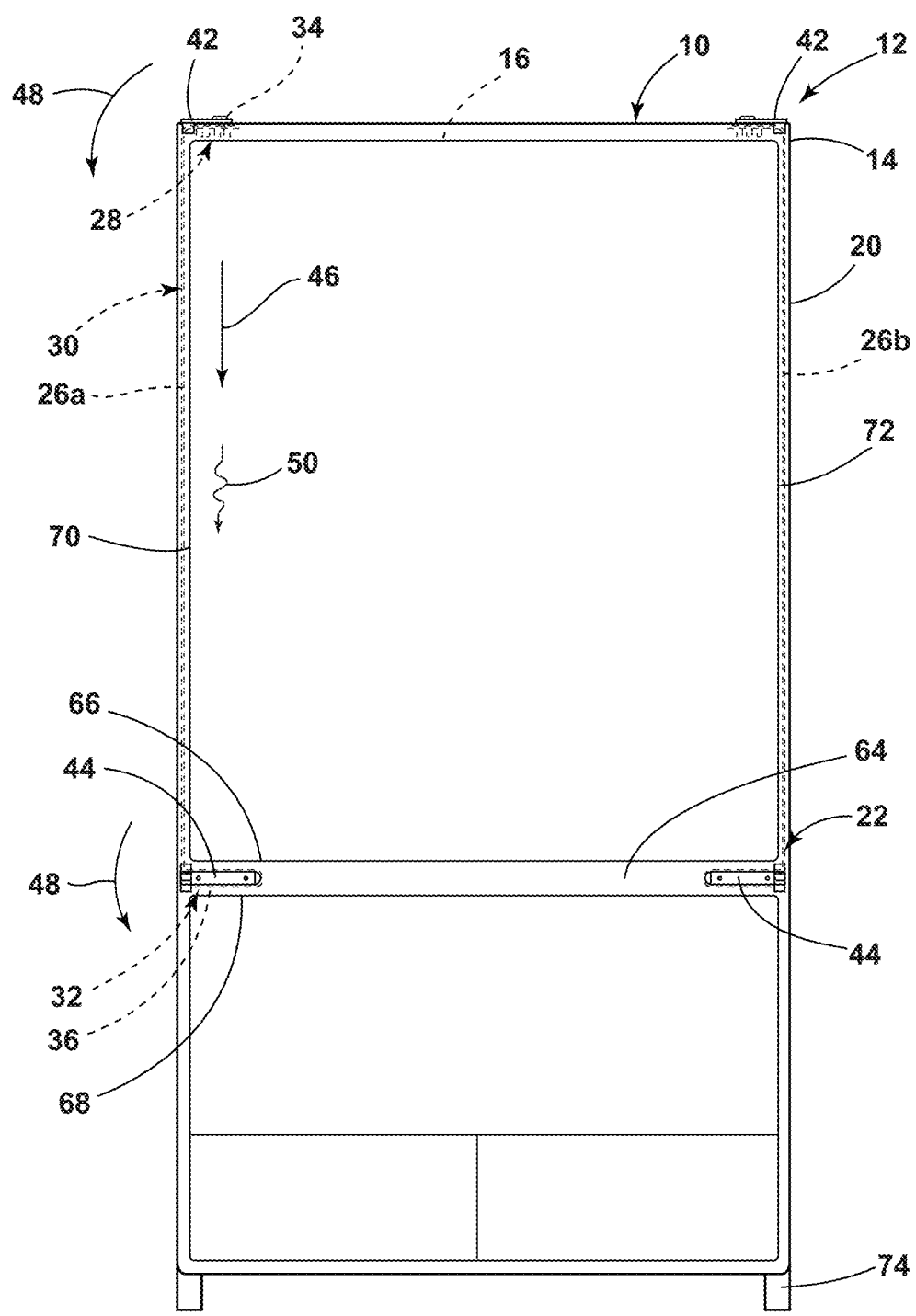
FIG. 3 is a front elevational view of the hinge support frame incorporated as part of the cabinet of the appliance, according to various embodiments.
Figure 4:
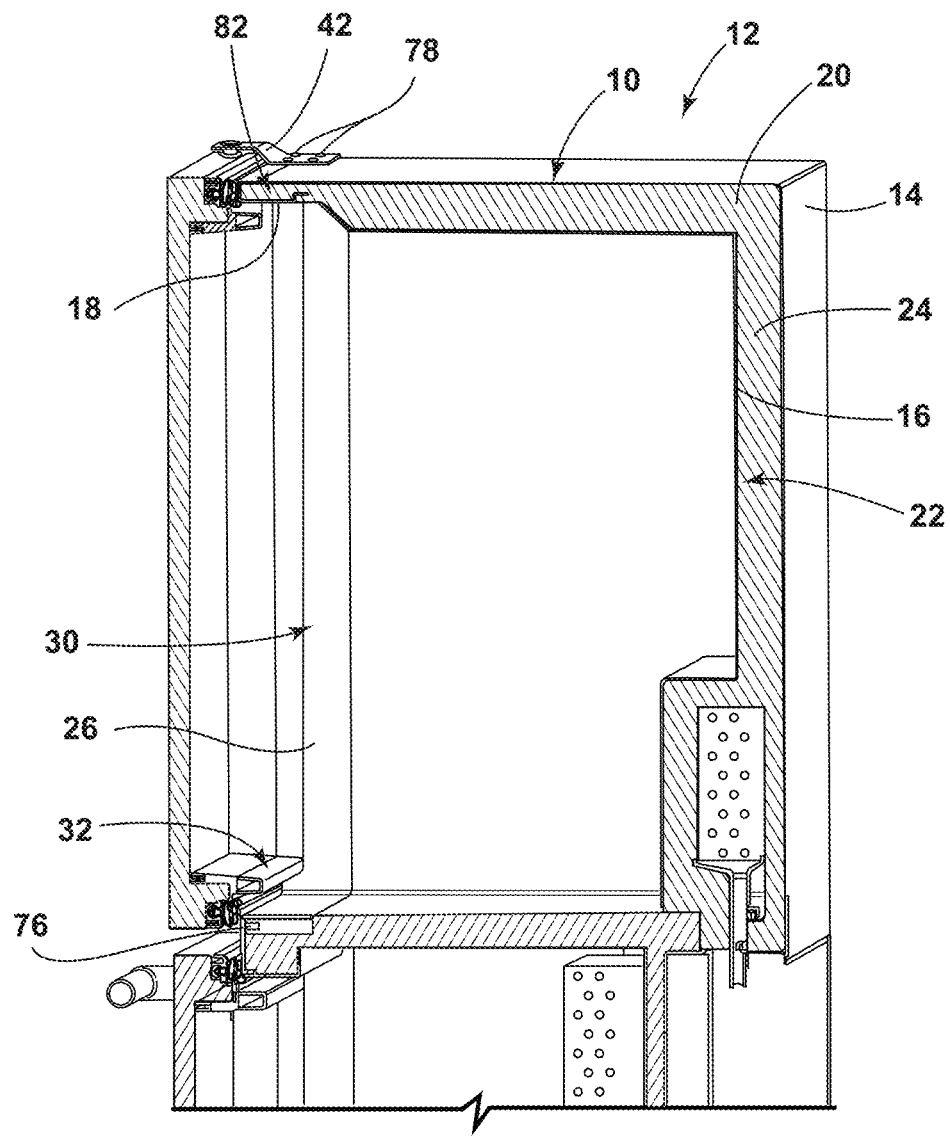
FIG. 4 is a cross-sectional view of the appliance of FIG. 1 taken along line IV-IV.
Figure 5:
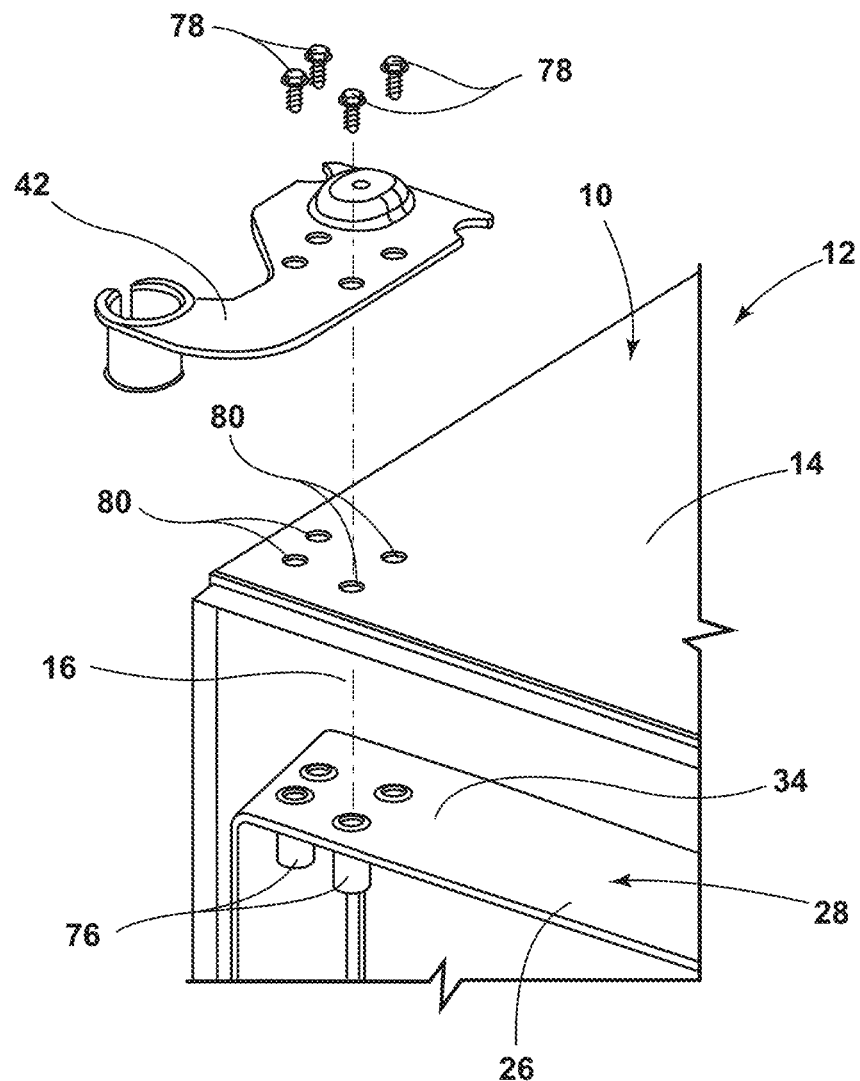
FIG. 5 is a partially exploded top perspective view of an upper hinge and upper hinge mount incorporated within the hinge support frame.

Referring to FIGS. 3-5, the upper and lower hinge mounts 34, 36 serve to provide hinge attachment points to which the various upper and lower hinges 42, 44 of the appliance 12 can be fixed and secured. The upper or lower hinges 42, 44 may further serve to vertically and rotationally support the various doors 40 of the appliance 12 and contents disposed within the doors 40 of the appliance 12. In this manner, when the doors 40 are attached to the upper or lower hinges 42, 44, the weight of the doors 40 is transferred to the frame 26. Accordingly, the weight of the doors 40 and the weight of contents placed within the doors 40 is directed to the frame 26, such that the downward forces 46, rotational forces 48, and/or torsion 50 applied by the doors 40 to minimize the effect on the structural integrity of the vacuum insulated structure 22 of the appliance 12. These forces can then be transferred through the pair of frames 26a, 26b to a base 74 of the appliance 12 or out to structural portions of the wrapper 14 and then to the base 74 of the appliance 12.

Referring to FIG. 3, the lower frame portion 32 can be disposed within the interior mullion 64. It is also contemplated that the trim breaker 18 can also define a portion of the interior mullion 64. According to various embodiments, the interior mullion 64 can include an upper trim breaker 66 and a lower trim breaker 68, where the lower frame portion 32 extends vertically between the upper and lower trim breakers 66, 68.

Referring to FIG. 4, the insulating cavity 20 is defined by the wrapper 14, the liner 16, and the trim breaker 18 and can be a hermetically sealed cavity. According to various examples, the insulating cavity 20 may include one or more vacuum insulated structures 22 to aid in decreasing thermal conductivity between an interior and exterior of the cabinet 10. In vacuum insulated structures 22, creating a vacuum within the insulating cavity 20 decreases heat transmission through the vacuum insulated structure 22. By creating a vacuum between the spaces intended to be thermally isolated, heat conduction is minimized because there is no, or less, material (e.g., air) to transfer the thermal energy between the thermally isolated spaces. The insulating cavity 20 may have an air pressure of less than about 1 atm, about 0.5 atm, about 0.4 atm, about 0.3 atm, about 0.2 atm, about 0.1 atm, or less than about 0.01 atm.

The upper hinge mounts 34 and the lower hinge mounts 36 can include attachment receptacles 76 that serve to receive fasteners 78 for coupling the upper or lower hinges 42, 44, respectively, to an opposing side of the wrapper 14 from the frame 26. The attachment receptacles 76 can be welded, adhered, or otherwise sealingly attached to a portion of the frame 26, such that a hermetic seal of the insulating cavity 20 is maintained during and after attachment of the upper and lower hinges 42, 44 to the upper and lower hinge mounts 34, 36, respectively. Accordingly, the attachment receptacles 76 are adapted to maintain the fasteners 78 separate from the insulating cavity 20 as the fasteners 78 may not puncture, or otherwise damage, the integrity of the vacuum insulated structure 22.

Referring again to FIG. 4, in some embodiments, the frame 26 can be integrally and/or directly attached to the wrapper 14 of the cabinet 10 as a thickened or reinforced portion of the wrapper 14. The thickening or reinforcement of the wrapper 14 can be accomplished through the addition of structural material at the portions described above or through folding over of the wrapper 14 to form thickened portions of the wrapper 14.

Referring to FIG. 5, one or more attachment apertures 80 are defined by the wrapper 14 proximately to the upper hinge mount 34 and are configured to receive the fasteners 78 therethrough. The upper frame portion 28 can be disposed within the insulating cavity 20 and can be aligned with the apertures 80. In this manner, the attachment receptacles 76 may be visible through the wrapper 14.

The upper hinge mount 34 is integrated within the upper frame portion 28 and includes one or more attachment receptacles 76 for receiving fasteners 78 for attaching the upper hinge 42 to the upper hinge mount 34. Similarly, the lower hinge mount 36 is integrated within the lower frame portion 32 and includes the one or more attachment receptacles 76 for receiving fasteners 78 for attaching the lower hinge 44 to the lower hinge mount 36. Again, the use of the attachment receptacles 76 can at least partially define the hermetically sealed insulating cavity 20. In some embodiments, the interior mullion 64 can include a foamed-in insulating material 24 that is kept at atmosphere and is not hermetically sealed or pressurized. In such an embodiment, the use of the attachment receptacles 76 for sealing the engagement between the lower hinges 44 and the lower hinge mounts 36 is still effective at minimizing the transfer of gas and thermal energy through the attachment points defined by the lower hinge mounts 36. The attachment receptacles 76, as with the upper hinge mounts 34, are adapted to receive the fasteners 78 for the lower hinges 44 and prevent the fasteners 78 from extending through the attachment receptacles 76, such that the fasteners 78 do not extend into the insulating cavity 20 within the interior mullion 64.

When the various fasteners 78 are attached to the upper or lower hinges 42, 44 and to the upper and lower hinge mounts 34, 36, the various fasteners 78 can extend through the one or more attachment apertures 80 and into the attachment receptacle 76. Leading ends of each fastener 78 may remain within the attachment receptacle 76 thereby preventing penetration into the insulating cavity 20.

Figures 6, 7, 8:
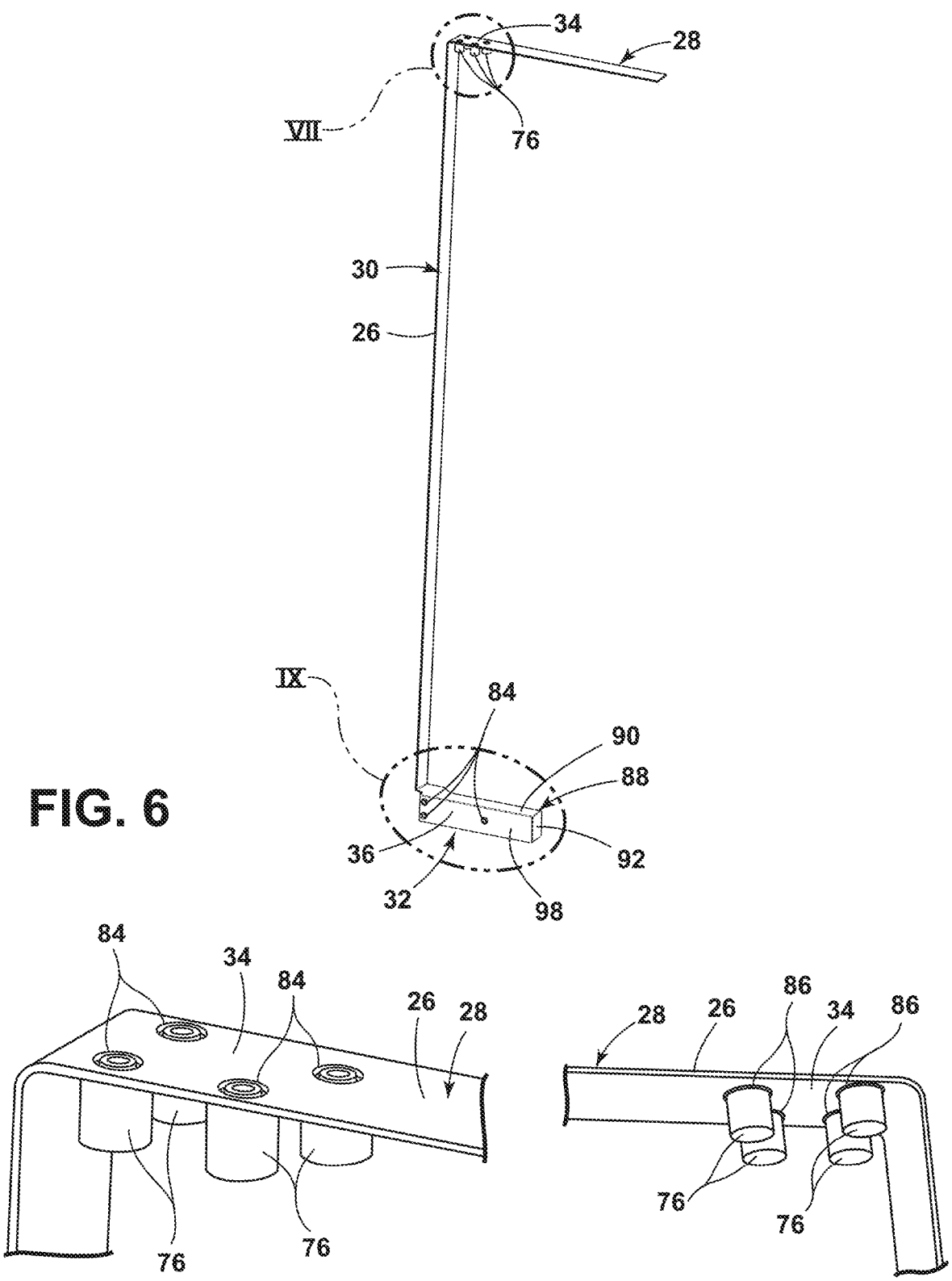
FIG. 6 is a side perspective view of the hinge support frame, according to various embodiments.
FIG. 7 is an enhanced top perspective view of the area VII of FIG. 6 illustrating an upper frame portion of the hinge support frame, according to various embodiments.
FIG. 8 is an enhanced lower perspective view of the area VII of FIG. 6 illustrating an upper frame portion of the hinge support frame, according to various embodiments.
Figure 9:
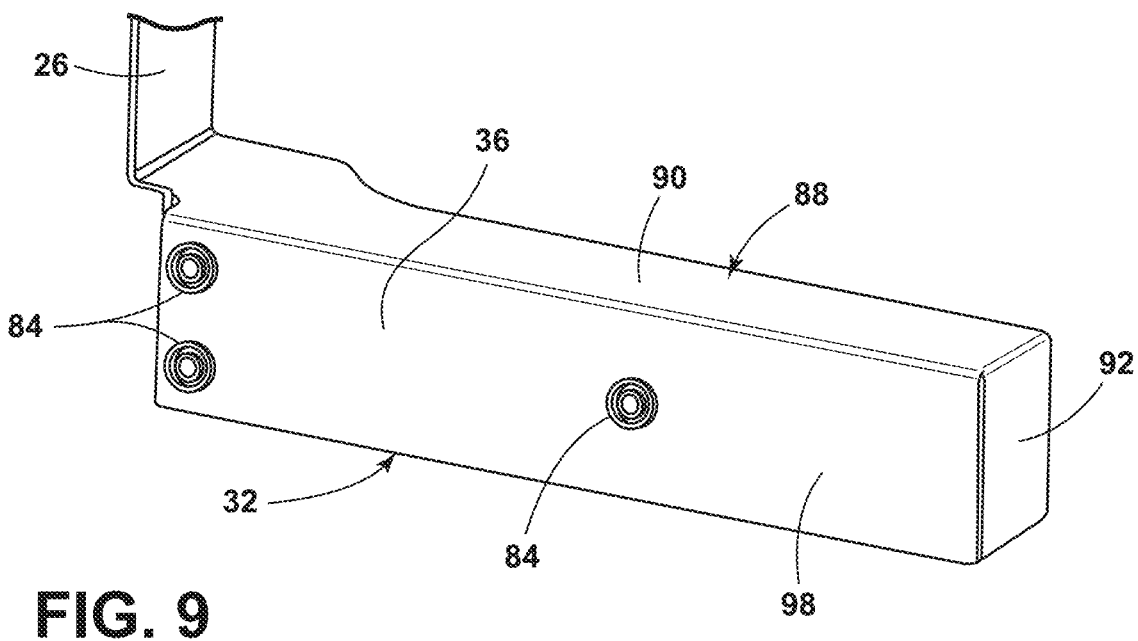
FIG. 9 is an enhanced front perspective view of the area IX of FIG. 6 illustrating a lower frame portion of the hinge support frame, according to various embodiments.
Figure 10:
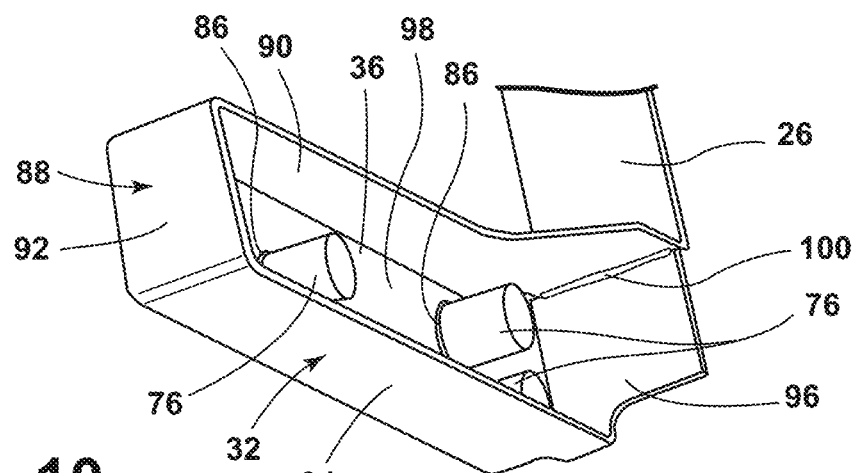
FIG. 10 is an enhanced side perspective view of the area IX of FIG. 6 illustrating a lower frame portion of the hinge support frame, according to various embodiments.
Figure 11:
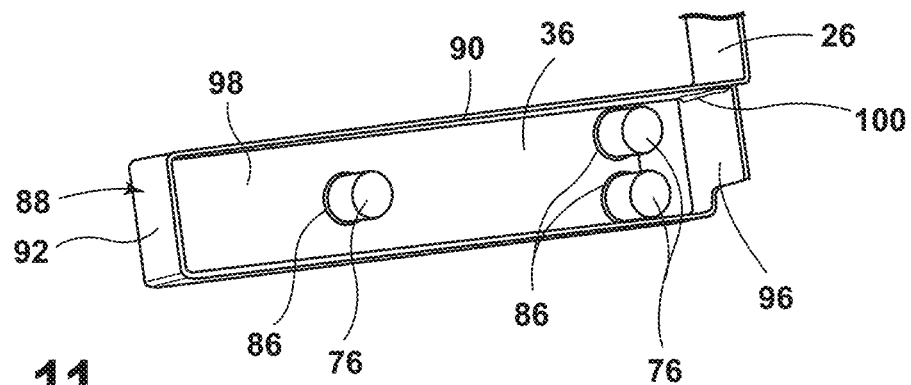
FIG. 11 is an enhanced rear perspective view of the area IX of FIG. 6 illustrating a lower frame portion of the hinge support frame, according to various embodiments.

Referring to FIGS. 6-8, the frame 26 includes the upper frame portion 28 that may extend along a top portion 82 (FIG. 4) of the cabinet 10 and defines the at least one upper hinge mount 34. The at least one upper hinge mount 34 can include one or more of upper hinge mounts 34 that are positioned proximate opposing left and right sidewalls 70, 72 (FIG. 3), respectively, of the cabinet 10. The frame 26 can also include a lower frame portion 32 that defines the at least one lower hinge mount 36. The at least one lower hinge mount 36 can include one or more of lower hinge mounts 36 that are positioned proximate the right and left sidewalls 70, 72, respectively, and in alignment with the one or more of upper hinge mounts 34 to provide mounting locations for a pair of French doors 40 that are opposingly and rotationally operable between open and closed positions. In various embodiments, the cabinet may include a pair of frames 26a, 26b (FIG. 3) that are disposed proximately to the right and left sidewalls 70, 72. According to the various embodiments, the pair of frames 26a, 26b can extend from the top portion 82 (FIG. 4) of the cabinet 10 down to a base 74 of a cabinet 10 such that various loads placed upon the pair of frames 26a, 26b can be transferred to the base 74 of the appliance 12 and into feet or rollers of the appliance 12 to be transferred to the floor, ground, or other substrate surface.

Referring to FIGS. 6-17, the frame 26 may be formed from a metallic, or other malleable, material and multiple portions (e.g., upper frame portion 28, vertical frame portion 30, and/or lower frame portion 32) of the frame 26 may be formed as a unitary assembly. For example, as illustrated in FIGS. 6-11, the upper frame portion 28, the vertical frame portion 30, and the lower frame portion 32 may be formed from a single component.

One or more voids 84 are then punched, or otherwise formed, in the upper frame portion 28 and the lower frame portion 32. The attachment receptacles 76 are then aligned with the voids 84 and attached thereto. As described above, the receptacles 76 may be hermetically sealed to the frame 26 through integral formation and/or through the use of an air non-permeable material 86. For example, according to various embodiments, an air non-permeable weldment may attach the attachment receptacles 76 to the frame 26.

The upper frame portion 28 may be substantially planar while the lower frame portion 32 may include a closed outer periphery 88. As illustrated in FIGS. 6-14, the closed outer periphery 88 of the lower frame portion 32 includes a top section 90, an outer section 92, a bottom section 94, an inner section 96, and a front section 98. The inner section 96 may be attached, coupled, or integrally formed with the top section 90 and/or the vertical frame portion 30. In some embodiments, an attachment material 100, such as weldment and/or an adhesive may be used to couple sections of the lower frame portion 32 to create the closed geometry. As used herein, "closed geometry" is defined as any geometrical shape that includes outer sections (i.e. the top section 90, the outer section 92, the bottom section 94, the inner section 96) that are coupled, attached, integrally formed with, in contact with, and/or supported by additional sections or portions of the frame 26 on opposing end portions. In additional embodiments, the lower frame portion 32 may have a cross section of any other closed shape including, but not limited to, circular, oval, rectangular, and/or any other polygonal cross sections.

According to various embodiments, each section 90, 92, 94, 96, 98 that forms the lower frame portion 32 may be formed from a single component. The sections 90, 92, 94, 96, 98 may be bent into any desired cross-sectional shape. Similarly, the upper frame portion 28 may be placed into a final orientation through any known manufacturing process. For example, the frame 26 may be disposed into a desired orientation through processes including, and not limited to, up-action air bending, V bending, R bending, hemming, seaming, coining, bottoming, forming, wiping, folding-type bending, custom bending, and so on.

Figure 12:
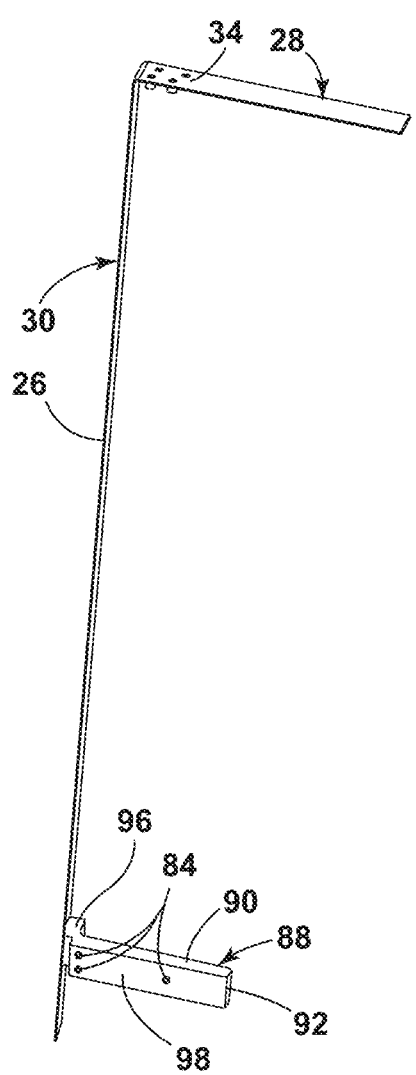
FIG. 12 is a front perspective view of the hinge support frame, according to an alternate embodiment.
Figure 13:
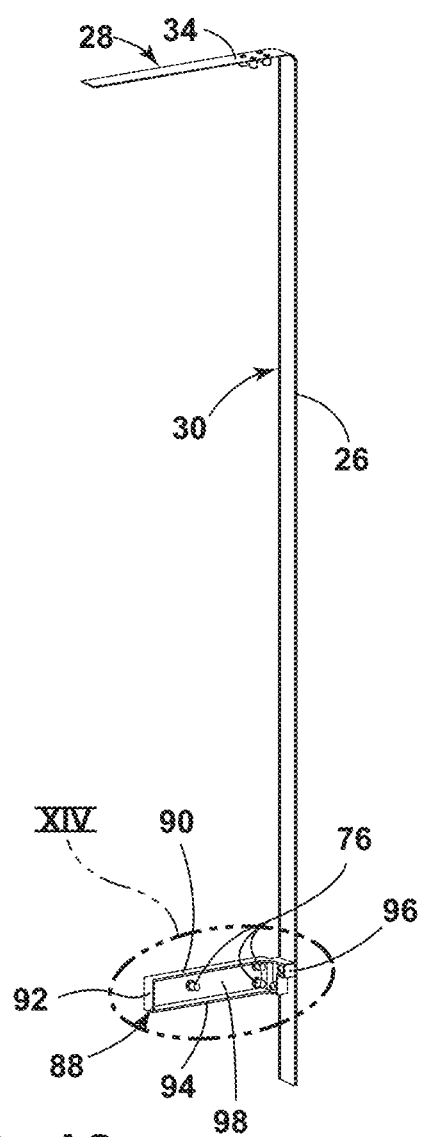
FIG. 13 is a rear perspective view of the hinge support frame, according to the embodiment of FIG. 12.
Figure 14:
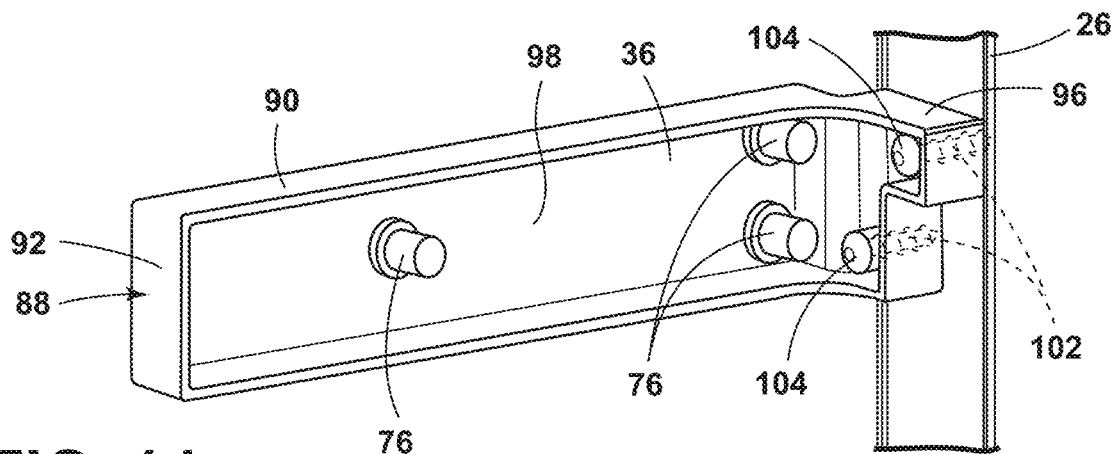
FIG. 14 is an enhanced rear perspective view of the area XIV of FIG. 13.

Referring to FIGS. 12-14, the upper frame portion 28 and the vertical frame portion 30 may be formed from a single component while the lower frame portion 32 is later attached thereto. The lower frame portion 32 may be a separate component that is attached to the vertical frame portion 30 and/or to the cabinet 10 through welding, fasteners 102, combinations thereof, and/or any other attachment mechanisms. Moreover, the lower frame portion 32 may have a closed geometry, as described above, that is formed through any manufacturing process. In embodiments in which the lower frame portion 32 is attached to the vertical frame portion 30, the lower frame portion 32 may include coupling receptacles 104 for disposing the fasteners 102 through the frame 26 thereinto. The coupling receptacles 104 may be hermetically sealed. The fasteners 102 that couple the lower frame portion 32 to the vertical frame portion 30 and/or to the cabinet 10 may be of a similar size or of a different size to the fasteners 78 utilized for coupling the upper and lower hinges 42, 44 to the upper and lower hinge mounts 34, 36, respectively.

In some embodiments, the manufacturing process used to form the upper frame portion 28 and/or the vertical frame portion 30 may be different from that used to form the lower frame portion 32. For example, the upper frame portion 28 and the vertical frame portion 30 may be formed through a bending and/or stamping process while the lower frame portion 32 may be formed through a casting process. Casting is a manufacturing process in which a liquid material is usually poured into a mold, which contains a hollow cavity of the desired shape, and then allowed to solidify. Once solidified, the lower frame portion 32 is coupled to the vertical frame portion 30. However, it is contemplated that any known manufacturing process may be utilized to form any portion 28, 30, 32 of the frame 26.

In embodiments in which the lower frame portion 32 is casted, or formed by any other like process, the attachment and coupling receptacles 76, 104 may be integrally formed therein. As described above, the attachment and coupling receptacles 76, 104 may be hermetically sealed and prevent the fasteners 78, 102 from insertion through any portion 28, 30, 32 of the frame 26. Moreover, the lower frame portion 32, or any portion 28, 30, 32 of the frame 26 that is casted, may have a closed outer periphery 88. The closed outer periphery 88 may provide additional resistance against rotational forces 48, downward (linear) forces 46, and/or torsion 50 when the door 40 is coupled to the upper or lower hinges 42, 44. Moreover, in various embodiments in which the lower frame portion 32 is casted, the upper frame portion 28 may be formed from a first material while the lower frame portion 32 may be formed from a second material. The first and second materials may vary from one another.

Figure 15:
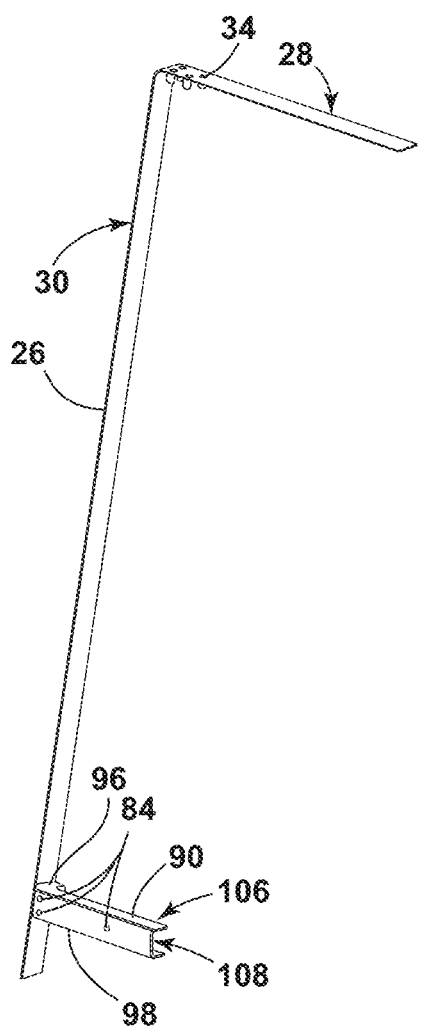
FIG. 15 is a front perspective view of the hinge support frame, according to an alternate embodiment.
Figure 16:
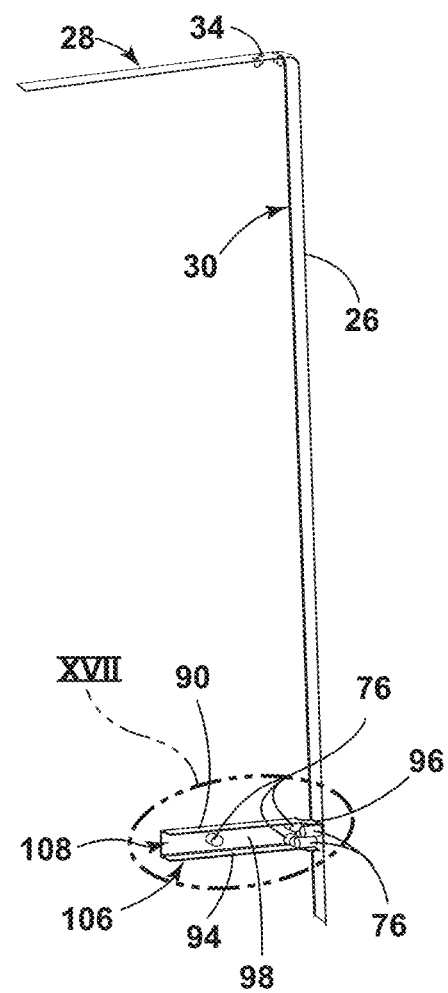
FIG. 16 is a rear perspective view of the hinge support frame, according to the embodiment of FIG. 15.
Figure 17:
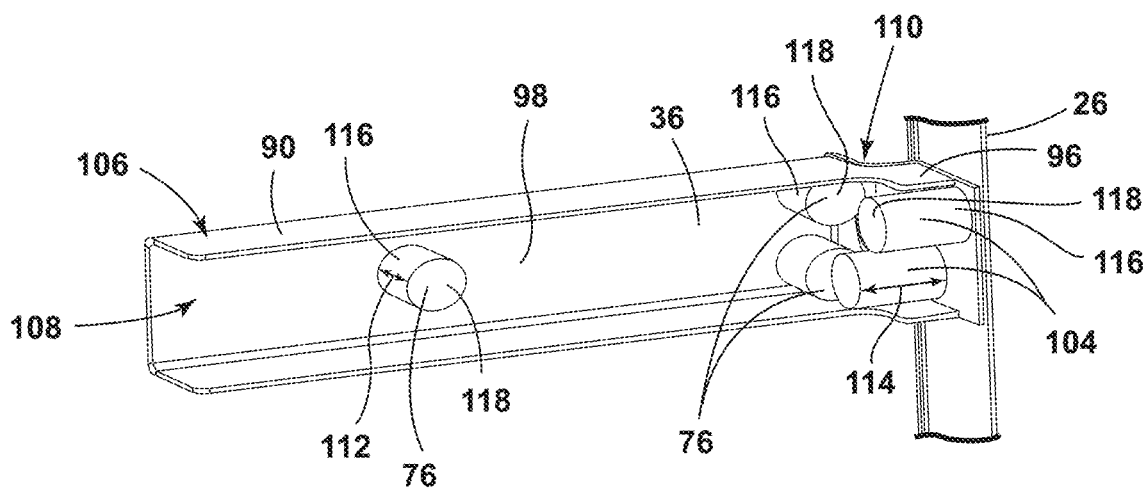
FIG. 17 is an enhanced rear perspective view of the area XVII of FIG. 16.

Referring to FIGS. 15-17, the lower frame portion 32, in various embodiments, may include an open periphery 106. For example, the lower frame portion 32 may have a similar structure to that described above, except that the top section 90 and the bottom section 94 may define a gap 108 therebetween.

The lower frame portion 32, according to various embodiments, may be formed through a cold-rolling process. In a cold-rolling process, rollers bend a metal sheet progressively and gradually into the final lower frame portion 32 shape with the specified bend radii, or bend angles. The metal sheet is loaded into an uncoiled machine and the metal sheet is fed through a roll former where it is bent into shape and sheared to the desired lengths. Further, a portion of the metal sheet that forms the lower frame portion 32 may be cut, punched, stamped, etc. then bent to form the inner section 96. The inner section 96 may be coupled to the top section 90 and/or bottom section 94 through any process known in the art. The inner section 96 may be separated from the front section 98 by a bent section 110.

As described above, the lower frame portion 32 may have increased strength once the top section 90, the bottom section 94, and/or the inner section 96 are formed and attached to one another, 90, 94, 96 and/or to the vertical frame portion 30. The inner section 96 may include one or more coupling receptacles 104 for operably coupling the lower frame portion 32 to the vertical frame portion 30. The coupling receptacles 104 may be hermetically sealed such that a vacuum and/or insulated structure 22 disposed between the wrapper 14 and the liner 16 (FIG. 3) may be maintained after the frame 26 has been formed and disposed within the insulating cavity 20.

As illustrated in FIG. 17, the attachment receptacles 76 may extend into the insulating cavity 20 in a first direction. The coupling receptacles 104 may extend into the insulating cavity 20 in a second direction. The first and second directions may be transverse to one another in various embodiments. In alternate embodiments, the attachment receptacles 76 and coupling receptacles 104 may be offset from one another 76, 104 in any other orientation. Alternatively still, the first and second directions may be parallel to one another.

Likewise, the one or more attachment receptacles 76 disposed on the upper frame portion 28 may extend in a third direction. The third direction may be orthogonal to the first and/or second directions. Alternatively, the third direction may be offset from the first and second directions by any angle. Alternatively still, the third direction may be parallel to the first and/or second directions.

Referring still to FIGS. 15-17, the attachment receptacles 76 may define a first height 112 while the coupling receptacles 104 may define a second height 114. In some embodiments, the first height 112 is less than the second height 114. In other embodiments, the first height 112 is greater than the second height 114. In various other embodiments, the first height 112 may be equal to the second height 114.

Referring to FIGS. 6-17, the attachment receptacles 76 and/or coupling receptacles 104 may be of a tubular geometry, or any other geometry. For example, in various embodiments, any of the attachment receptacles 76 and/or coupling receptacles 104 may have a cubical, spherical, rectangular, and/or any other shape without departing from the teachings provided herein.

With further reference to FIGS. 6-17, the attachment receptacles 76 and/or coupling receptacles 104 may include an extension surface 116 that extends (e.g., transversely) from the upper frame portion 28, the lower frame portion 32, and/or the vertical frame portion 30. The extension surface 116 may partially and/or fully encompass the fastener 78, 102 once the fastener 78 102 is disposed within the attachment receptacle 76 and/or coupling receptacle 104.

A terminal surface 118 may define the height 112, 114 of the attachment receptacles 76 and coupling receptacles 104, respectively. The terminal surfaces 118 may be planar and/or curved. Further, the terminal surfaces 118 may be transverse to the extension surface 116. Alternatively, in some embodiments, the intersection of the extension surface 116 to the terminal surface 118 may have a radius of any desired curvature. The attachment receptacles 76 and coupling receptacles 104 may be formed from any number of components that may be coupled to one another to form the hermetically sealed attachment receptacles 76 and coupling receptacles 104. Alternatively, the attachment receptacles 76 and/or coupling receptacles 104 may be integrally formed through any manufacturing process known in the art.

According to the various embodiments, the hinge support frame 26 described herein can be incorporated within various appliances 12 that can include, but are not limited to, refrigerating appliances, freezers, humidors, ovens, laundry appliances, water heaters, various other household appliances and fixtures and other similar household and commercial applications.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An appliance comprising:
    a frame including an upper frame portion integrally formed with and extending perpendicularly from a vertical frame portion and a lower frame portion extending perpendicularly from the vertical frame portion, wherein the upper frame portion includes a first attachment receptacle extending in a first direction and the lower frame portion includes a second attachment receptacle extending in a second direction, the first direction transverse to the second direction; and
    a door rotationally mounted to the frame via an upper hinge mounted to the upper frame portion and a lower hinge mounted to the lower frame portion.

2. The appliance of claim 1, wherein the lower frame portion includes a coupling receptacle configured to attach the lower frame portion to the vertical frame portion.

3. The appliance of claim 2, wherein the coupling receptacle extends in a third direction, and further wherein the third direction is perpendicular to both the first and second directions.

4. The appliance of claim 1, further comprising:
    a cabinet having a wrapper, a liner, and a trim breaker, wherein the wrapper, the liner, and the trim breaker define an insulating cavity therebetween.

5. The appliance of claim 4, wherein the first and second attachment receptacles at least partially define the insulating cavity.

6. The appliance of claim 1, wherein the lower frame portion is integrally formed with the vertical frame portion.

7. The appliance of claim 6, wherein each of the first and second attachment receptacles are sealed while a fastener is disposed within the respective attachment receptacle.

8. An appliance comprising:
    a frame including an upper frame portion and a lower frame portion spaced apart by a vertical frame portion, each of the upper and lower frame portions extending perpendicularly from the vertical frame portion;
    a first attachment receptacle disposed on the upper frame portion;
    a second attachment receptacle disposed on the lower frame portion;
    a coupling receptacle disposed on the lower frame portion, wherein the coupling receptacle is configured to receive a fastener to couple the lower frame portion with the vertical frame portion;
    a door rotationally mounted to the frame via an upper hinge mounted to the upper frame portion and a lower hinge mounted to the lower frame portion.

9. The appliance of claim 8, wherein each of the upper frame portion and the lower frame portion include a terminal end.

10. The appliance of claim 8, further comprising:
    a cabinet defining an insulating cavity; and
    a wrapper defining a plurality of apertures that correspond to the first and second attachment receptacles.

11. The appliance of claim 10, wherein the first and second attachment receptacles at least partially define the insulating cavity.

12. The appliance of claim 10, wherein the first and second attachment receptacles and coupling receptacle each maintain a fastener therein that is separated from the insulating cavity.

13. The appliance of claim 8, wherein the first attachment receptacle extends in a first direction and the second attachment receptacle extends in a second direction, the first direction transverse to the second direction.

14. The appliance of claim 13, wherein the coupling receptacle extends in a third direction, the third direction transverse to each of the first and second directions.

15. The appliance of claim 8, wherein the lower frame portion includes a top section, a bottom section, a front section, and an inner section, and further wherein the coupling receptacle is disposed on the inner section of the lower frame portion.

16. An appliance comprising:
- a cabinet defining an insulating cavity;
- a frame disposed within the insulating cavity and including a lower frame portion, the lower frame portion including a front section and an inner section;
- a first sealed attachment receptacle disposed on the front section of the lower frame portion and extending in a first direction;
- a coupling receptacle disposed on the inner section of the lower frame portion and extending in a second direction, the second direction perpendicular to the first direction;
- a vertical frame portion aligned with the inner section of the lower frame portion and configured to be coupled with the lower frame portion by a fastener received by the coupling receptacle; and
- a door rotationally mounted to the cabinet via the frame via a hinge, the hinge disposed on an opposing side of the cabinet from the frame.

17. The appliance of claim 16, wherein the frame further includes an upper frame portion having a second sealed attachment receptacle.

18. The appliance of claim 17, wherein the first sealed attachment receptacle extends in a first direction and the second sealed attachment receptacle extends in a second direction, the first direction transverse to the second direction.

19. The appliance of claim 16, wherein the lower frame portion includes a bent section positioned between the front section and the inner section of the lower frame portion.

20. The appliance of claim 16, further comprising:
- a wrapper defining an aperture that corresponds to the attachment receptacle of the lower frame portion.

\* \* \* \* \*